US012408050B2

(12) United States Patent
Luo

(10) Patent No.: US 12,408,050 B2
(45) Date of Patent: Sep. 2, 2025

(54) EMERGENCY COMMUNICATIONS TESTING USING SHORT CODES

(71) Applicant: T-Mobile USA, Inc., Bellevue, WA (US)

(72) Inventor: Tong Luo, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 400 days.

(21) Appl. No.: 18/168,690

(22) Filed: Feb. 14, 2023

(65) Prior Publication Data

US 2024/0276252 A1 Aug. 15, 2024

(51) Int. Cl.
*H04W 24/06* (2009.01)
*H04W 4/14* (2009.01)
*H04W 4/90* (2018.01)

(52) U.S. Cl.
CPC ............. *H04W 24/06* (2013.01); *H04W 4/14* (2013.01); *H04W 4/90* (2018.02)

(58) Field of Classification Search
CPC ...... H04M 1/24; H04M 3/5183; H04M 3/323; H04W 4/029; H04W 4/02; H04W 24/04; H04W 4/90; H04W 4/14; H04W 24/06; H04L 12/66

USPC ............................................ 455/404.1, 404.2
See application file for complete search history.

(56) References Cited

U.S. PATENT DOCUMENTS

| | | | |
|---|---|---|---|
| 7,420,963 B1* | 9/2008 | Shankar | H04L 12/66 370/352 |
| 10,791,221 B1* | 9/2020 | Vislocky | H04M 3/5116 |
| 11,089,156 B1* | 8/2021 | Luo | H04W 76/50 |
| 2008/0254790 A1* | 10/2008 | Baldridge | H04M 3/5116 455/424 |
| 2010/0317317 A1* | 12/2010 | Maier | H04W 4/029 455/404.2 |

* cited by examiner

*Primary Examiner* — Maria El-Zoobi
(74) *Attorney, Agent, or Firm* — Lee & Hayes, P.C.

(57) ABSTRACT

Systems and methods for performing emergency communications testing are disclosed. Network components, such as a text control center, may be configured to recognize a short code in a text message and enter an emergency communications testing mode for the user device that transmitted the short code. In testing mode, the network components may process emergency communications by determining the emergency processing data (e.g., routing instructions, appropriate PSAP, etc.) and providing that information to the user device rather than forwarding such communications to an emergency services provider. The network component may revert to normal operation after a period of time or after processing a predetermining number of emergency communications.

20 Claims, 8 Drawing Sheets

EMERGENCY COMMUNICATIONS TESTING USING SHORT CODES

BACKGROUND

The number of wireless communications devices in use has grown exponentially, along with the number of communications networks used to support such devices. Typical (e.g., non-emergency) communications facilitated by such networks do not include an indication of a current wireless communications device location. For example, while wireless communications devices typically include location determination components and/or services, such as global positioning system (GPS) components, the current geographical location of a wireless communications device is not indicated in its communications with a network and/or other devices to protect user privacy. A location may be associated with a device identifier, such as a telephone number (e.g., based on area code) that may be included or determined for the device's communications, but this location remains the same for the identifier regardless of the actual current geographical location of the wireless communications device and therefore is not an accurate indicator of the device's current location.

Emergency communications are an exception to this general practice of maintaining current user device location privacy. In communications to an emergency services agency or emergency services personnel (e.g., police ambulance, 911, etc.), the device's location may be key to quickly locating the user of the device and providing assistance. Therefore, in emergency communications (e.g., calls or texts to 911), a wireless communications device may be configured to include a current device location as determined by its location determinations components and/or services. While this configuration protects user privacy while facilitating a proper response in emergency situations, it makes testing new or updated devices and network configurations for proper emergency messaging and behavior challenging because emergency communications are necessarily transmitted to emergency services systems. It is currently difficult to test the processing of emergency communications without involving emergency services in a non-emergency or without using test messages that are not truly reflective of emergency messages and therefore may not adequately test such processing.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
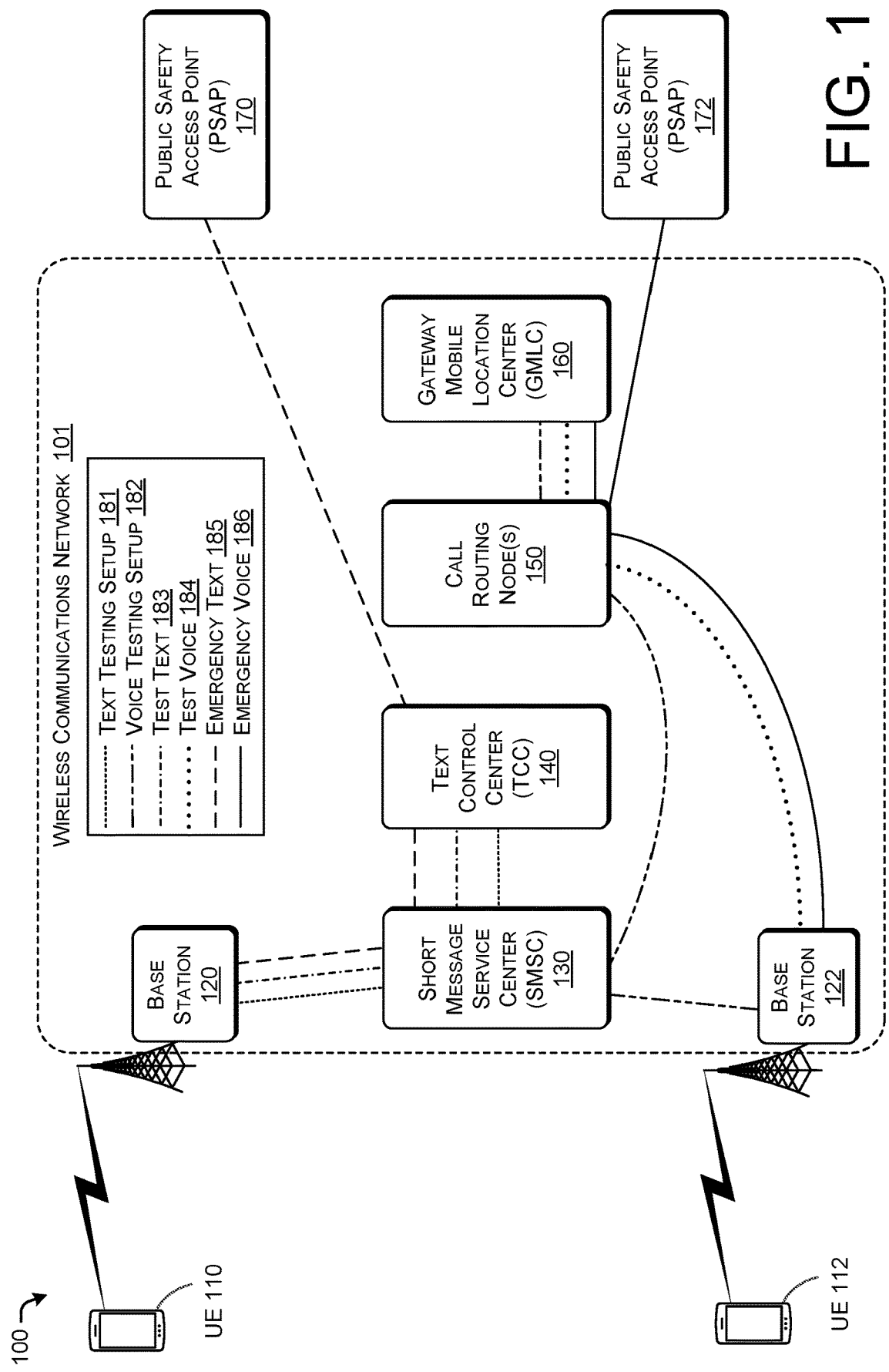
FIG. 1 is a schematic diagram of an illustrative wireless communication network environment in which systems and techniques for testing emergency communications using short codes may be implemented, in accordance with examples of the disclosure.

This disclosure is directed in part to systems and techniques for more efficiently and accurately testing the processing of emergency communications of various types that may be initiated by a user equipment (UE) (e.g., smartphone, cell phone, mobile device, wireless communication device, mobile station, etc.) in advanced wireless communications networks. Such advanced networks include networks that support one or more 3GPP standards, including, but not limited to, Long Term Evolution (LTE) networks (e.g., 4G LTE networks) and New Radio (NR) networks (e.g., 5G NR networks). However, the disclosed systems and techniques may be applicable in any network or system in which a user device may request and receive access to communicate with emergency services and/or systems using any protocol.

Based on current regulations and requirements, emergency communications are routed based on the current location of the originating device. For example, a 911 call or a text to 911 initiated by a UE may be routed to a public safety access point (PSAP) that is the closest (e.g., geographically most proximate) PSAP to the current location of the UE from among available PSAPs. A PSAP may be configured to receive such emergency communications and provide them to one or more human operators and/or emergency services systems associated with a particular geographical area. The emergency communications received by the PSAP may include an indication of a current geographical location of the originating device (e.g., UE). This location may be determined by the UE and/or one or more systems within the network supporting the UE for inclusion in the emergency communications. For example, a UE may include location determination components and/or services, such as GPS components, that may determine a current geographical location of a wireless communications device that may be included in an emergency communication initiated by the UE.

Various operations may be performed within a wireless communications network in order to determine a correct PSAP for an emergency communication and to provide the emergency communication and relevant data to the PSAP. These operations may involve various components within the wireless communications network that may be added, removed, and/or modified similarly to any other components of such networks. The operations performed in processing emergency communications may also be changed over time for various reasons, regardless of whether the components performing such operations change. Therefore, it is important to test such operations and components when they are adjusted and/or from time to time to ensure the emergency communications are processed properly. This is especially important for emergency communications processing operations and components because such communications are used in situations where the health, safety, and even life of a user may be at stake.

Properly processed emergency communications are transmitted to a PSAP that is most geographically proximate to the originating device to ensure the most rapid response from first responders and to assist in emergency response activities. This makes testing emergency communications processing without actually involving emergency services personnel and systems difficult. In current systems and techniques, a designated alternative number may be used for emergency communications testing (e.g., other than 911). For example, a UE may be operated to transmit texts or originate voice calls to "912," "919," or some other alternative testing destination number. However, many UEs are configured to include current UE location information only with legitimate emergency communications (e.g., calls and texts to 911), excluding the current user location from any other type of communication to protect user privacy. Due to the wide variety of UEs and other user devices that may be supported by a wireless communications network and the proprietary nature of the components and software configured on such devices, it is not practical, and may not even be possible, for a network operator to modify this behavior in UEs for testing purposes. Moreover, there is no standardized or commonly agreed upon testing number(s), which prevents manufacturers of UEs and other wireless devices from configuring such devices in advance to include a current device location in testing communications.

The disclosed systems and techniques may be used to test emergency communications more accurately and efficiently without requiring the alteration of UEs or other user devices and without involving actual emergency services systems and personnel in the testing process. In various examples, a network component, such as a text control center (TCC) or a gateway mobile location center (GMLC), may be configured to initiate an emergency communications testing mode for a particular user device (e.g., UE). While in an emergency communications testing mode, this component may alter its normal behavior for testing emergency communications and/or to instruct one or more other network components to alter their respective behaviors for testing purposes. These behavior operations may be implemented in response to receiving one or more particular text messages from a UE or other user device operated by a testing user. The TCC and/or the one or more altered network components may revert to normal behavior after meeting one or more criteria, receiving one or more notifications, and/or completing one or more testing operations.

For example, as described in more detail herein, a TCC may be configured to enter an emergency text communications testing mode ("text testing mode") in response to receiving a particular text short code from a UE. Such short codes may take any form and may include any number and combination of alphanumeric characters. For instance, a text short code of "922" may be used herein as an exemplary short code initiating a text testing mode without limitation. In response to receipt of a text texting mode short code, a TCC may enter a text testing mode for communications originating with the UE that originated the text testing mode short code. Further in response to such a text texting mode short code, the TCC may reply to the originating UE with a testing mode confirmation communication that may include one or more parameters, details, and/or other information associated with the text testing mode.

While in text testing mode for a particular UE, the TCC may perform testing operations in response to receiving an emergency text communication from that UE, for example, instead of performing normal emergency communications processing operations. For example, a testing operator that operated the UE to transmit the text texting mode short code (and resultingly place the TCC in text testing mode) may then operate the UE to transmit an emergency text (e.g., to 911). In response to receiving this emergency text, the TCC, because it is in text testing mode, may then determine the UE's current location (e.g., based on the emergency text). The TCC may next determine the appropriate PSAP for the UE's current location. Rather than transmitting the emergency text to that PSAP, because the TCC is in text testing mode for this UE, the TCC may reply to the UE with a testing information communication that may include the determined PSAP, the determined current UE location, a timestamp, additional PSAP data, and/or other testing information.

In various examples, the TCC may exit the text testing mode or otherwise return to normal text operating mode after responding to a threshold number of emergency texts. For example, the TCC may be configured to remain in text testing mode until one emergency text has been processed for the associated UE. Alternatively or additionally, the TCC may exit the text testing mode or otherwise return to normal text operating mode after a threshold period of time has passed, in some examples, regardless of the number of emergency texts processed in text testing mode. For example, the TCC may be configured to remain in text testing mode for 5 minutes, 10 minutes, 1 hour, etc. Alternatively or additionally, the TCC may exit the text testing mode or otherwise return to normal text operating mode after receiving another short code from the originating UE. For example, the TCC may be configured to exit text testing mode in response to receiving a "922x" or "822" short code from the originating UE. Other criteria may be used in addition, or instead, by a TCC to determine when to revert to normal operation from text testing mode for a particular UE. Note that any such criteria may be indicated in a testing mode confirmation communication and/or in a testing information communication.

Once back in normal operating mode, a TCC may handle subsequent emergency texts from the UE formally in text testing mode normally. That is, the TCC will, in response to receiving an emergency text from the UE, determine the current UE location and the appropriate PSAP for that location and forward the emergency text to the PSAP. The TCC may also, or instead, further facilitate emergency communications between the UE and the PSAP.

The disclosed systems and techniques may also be used to test emergency voice communications. For example, as described in more detail herein, a gateway mobile location center (GMLC) may be configured to enter an emergency voice communications testing mode ("voice testing mode") in response to receiving a particular text short code from a UE (e.g., via short message service center (SMSC)). Such short codes may take any form and may include any number and combination of alphanumeric characters. For instance, a text short code of "933" may be used herein as an exemplary short code initiating a voice testing mode without limitation.

In response to receipt of a voice texting mode short code, a GMLC may enter a voice testing mode for communications originating with the UE that originated the voice testing mode short code. In response to such a voice texting mode short code in a text, the SMSC may forward the short code to a network location-based services component, such as a GMLC, to enter a voice testing mode. The location-based services component may reply with a confirmation message that may include voice testing mode data. The SMSC may forward this confirmation message to the originating UE with a testing mode confirmation communication that may include one or more parameters, details, and/or other information associated with the voice testing mode.

While in voice testing mode for a particular UE, the location-based services component may perform testing operations in response to receiving an emergency voice communication from that UE, for example, instead of performing normal emergency communications processing operations. For example, a testing operator that operated the UE to transmit the voice testing mode short code (and resultingly place the GMLC and/or other location-based services component in voice testing mode) may then operate the UE to initiate an emergency voice call (e.g., a call to 911). In response to receiving a request to initiate this call, the GMLC and/or other location-based services component, because it is in voice testing mode, may then determine the UE's current location (e.g., based on the emergency text). The GMLC and/or other location-based services component may next determine the appropriate PSAP for the UE's current location. Rather than setting up the emergency call between the UE and the PSAP, because the GMLC and/or other location-based services component is in voice testing mode for this UE, the GMLC and/or other location-based services component may set up a testing information communication (e.g., a voice communication and/or a text communication) between the UE and a PSAP simulation function that may indicate the determined PSAP, the determined current UE location, a timestamp, additional PSAP data, and/or other testing information.

In various examples, the GMLC and/or the location-based services component may exit the voice testing mode or otherwise return to normal voice operating mode after responding to a threshold number of emergency call requests. For example, the location-based services component may be configured to remain in voice testing mode until one emergency call has been processed for the associated UE. Alternatively or additionally, the GMLC and/or other location-based services component may exit the voice testing mode or otherwise return to normal voice operating mode after a threshold period of time has passed, in some examples, regardless of the number of emergency calls processed in voice testing mode. For example, the GMLC and/or other location-based services component may be configured to remain in voice testing mode for 5 minutes, 10 minutes, 1 hour, etc. Alternatively or additionally, the GMLC and/or other location-based services component may exit the voice testing mode or otherwise return to normal voice operating mode after receiving another instruction via the SMSC that may include a short code from the originating UE. For example, the SMSC may be configured to transmit to the GMLC and/or location-based services component an exit voice testing mode message that may include a "933x" or "833" short code from the originating UE. Other criteria may be used in addition, or instead, by a GMLC and/or a location-based services component to determine when to revert to normal operation from voice testing mode for a particular UE. Note that any such criteria may be indicated in a testing mode confirmation communication and/or in a testing information communication.

Once back in normal operating mode, a GMLC and/or location-based services component may handle subsequent emergency calls from the UE formally in voice testing mode normally. That is, the location-based services component will, in response to receiving an emergency call request from the UE, determine the current UE location and the appropriate PSAP for that location and provide routing instructions for the emergency call to one or more nodes in the network to facilitate the emergency call between the UE and the PSAP. An SMSC may not be involved in such normal emergency call operations as such operations may not involve text communications.

By facilitating the more efficient and accurate testing of emergency communications operations and components, systems and methods described herein can improve the performance and increase the efficiency of network resources (and therefore UE resources), while improving the user experience by ensuring that emergency communications are properly processed. For example, the methods and systems described herein may be more efficient and/or more robust than conventional techniques, as they may increase the efficiency of UE and network resource utilization by facilitating the testing of communications truly reflecting actual emergency communications without interfering with operational emergency services or requiring modifications to user equipment. Moreover, the methods and systems described herein provide a technological improvement over existing emergency communications testing systems and processes by facilitating an improved testing user experience and increasing network efficiency by reducing the utilization of operational emergency communications resources communications when testing emergency communication operations and components. In addition to improving the efficiency of network and device resource utilization, the systems and methods described herein can provide more robust systems by, for example, making more efficient use of network devices and user devices by reducing unnecessary and/or unproductive device and network modifications and testing signaling, thereby freeing network and user device resources for more productive operations.

Illustrative environments, signal flows, and techniques for implementing systems and techniques for testing emergency communications using short codes are described below. However, the described systems and techniques may be implemented in other environments.

Illustrative System Architecture

FIG. 1 is a schematic diagram of an illustrative wireless network environment 100 in which the disclosed systems and techniques may be implemented. The environment 100 may include a UE 110 that may wirelessly communicate with a base station 120. While referred to as a "base station" for explanatory purposes herein, the base station 120 may be any type of base station, including, but not limited to, any type of base transceiver station (BTS), NodeB, eNodeB, gNodeB, etc. The base station 120 may communicate with other devices and elements in the core of a wireless communications network 101. The environment 100 may also include a UE 112 that may wirelessly communicate with a base station 122 that may also be any type of base station, including, but not limited to, any type of BTS, NodeB, eNodeB, gNodeB, etc. The base station 122 may also communicate with other devices and elements in the core of a wireless communications network 101. The wireless communications network 101 may be any one or more networks that facilitate communications between devices of various types, such as computing devices and mobile devices (e.g., UEs). Various connections between devices in the network 101 may be wired, wireless, or a combination thereof. In various embodiments, the wireless communications network 101 may facilitate communications with one or more wireless devices, such as UEs. The wireless communications network 101 may facilitate packet-based communications between such wireless devices and devices on the Internet and/or one or more systems and devices external to the wireless communications network 101, such as PSAP 170 and PSAP 172.

The UE 110 and the UE 112 may exchange text communications with a short message service center (SMSC) 130 via the base station 120 and the base station 122, respectively. The SMSC 130 may facilitate communications between these UEs and a TCC 140, that may represent one or more TCCs. For example, the SMSC 130 may direct text communications from the UEs to the TCC 140 for further processing, and relay communications received from the TCC 140 to the UEs, as described in more detail herein. The SMSC 130 may also, or instead, direct text communications from the UEs to other entities for further processing, such as one or more call routing nodes 150 and/or a GMLC 160, and relay communications received from such entities to the UEs, as described in more detail herein.

The wireless communications network 101 may further include one or more call routing nodes 150 that may be any one or more routing nodes of any type configured to route or otherwise facilitate voice calls. The UE 110 and the UE 112 may exchange call establishment data and voice communications with the call routing nodes 150 via the base station 120 and the base station 122, respectively. The call routing nodes 150 may interact with the GMLC 160 to determine call routing instructions based on, for example, UE locations. For example, the GMLC 160 may determine an appropriate PSAP for a UE based on the UE's current location. In some examples, the GMLC 160 may be dedicated to providing location-based services for emergency communications, while in other examples, the GMLC 160 may also provide other location-based services.

The wireless communications network 101 may additionally facilitate communications between the UEs 110 and 112 and external systems, such as the PSAP 170 and/or the PSAP 172. For example, the UEs may exchange text communications with the PSAPs via the gNodeBs, SMSC 130, and/or TCC 140. The UEs may establish voice communications with the PSAPs via the gNodeBs and call routing nodes 150, using location determination services of the GMLC 160.

Note that the components, systems, services, and functions represented in the environment 100 are an exemplary subset of components, systems, services, and functions that may be configured in a wireless communications environment. One skilled in the art will recognize that many other components, systems, services, and functions may be configured in such an environment and interact with the components, systems, services, and functions represented in FIG. 1.

Various emergency communications operations in the wireless communications network 101 may be tested using one or both of the UE 110 and UE 112 according to the disclosed examples. The various signal paths associated with setting up and performing such testing as well as performing actual emergency communications are illustrated in FIG. 1.

For example, the UE 110 may initiate a text testing operation by transmitting a text testing request to the TCC 140 via the base station 120 and the SMSC 130. The signal path 181 may represent the path that such a request and related signals may take. The text testing request from the UE 110 may include a short code (e.g., "922") that may cause the TCC 140 to enter an emergency text testing mode for the UE 110. In response to receiving such a text texting request and entering a text testing mode for the UE 110, the TCC 140 may reply to the UE 110 with a testing mode confirmation communication. This confirmation may indicate a confirmation of text testing mode at the TCC 140 for the UE 110 and/or one or more parameters, details, and/or other information associated with the text testing mode. For example, the confirmation may explicitly indicate that the testing mode will be active for a particular number of test emergency texts, a particular amount of time, until another (same or different) short code is received, etc. The TCC 140 may store an indicator of text testing mode and an indicator of the UE 110 to maintain a record of the testing mode for the UE 110. The indicator of the UE 110 may take any form, including a telephone number, a mobile station international subscriber directory number (MSISDN), an international mobile subscriber identity (IMSI), a mobile device number (MDN), etc. For example, the TCC 140 may store an array of identifiers associated with UEs for which the TCC 140 may be in text testing mode.

While in text testing mode for the UE 110, the TCC 140 may perform testing operations in response to receiving an emergency text communication from the UE 110. For example, an operator of the UE 110 may transmit a test emergency text (e.g., to 911) that may be received by the TCC 140 via the base station 120 and the SMSC 130. The signal path 183 may represent the path that such a test emergency text and related signals may take. In response to receiving this emergency text, the TCC 140 may then determine that the text originated with the UE 110, determine that the TCC 140 is in text testing mode for the UE 110 (e.g., by comparing an identifier in the test emergency text to stored UE identifiers associated with UEs for which the TCC is in text testing mode), and responsively determine a current location for the UE 110 (e.g., based on location data include by the UE 110 in the test emergency text). The TCC 140 may next determine the appropriate PSAP for the UE 110's current location (e.g., using the GMLC 160 (not included in the signal path 183) and/or other means). The TCC 140 may then transmit a testing response to the UE 110 with testing information, such as one or more of the determined PSAP, the determined current UE location, a timestamp, additional PSAP data, and any other testing information.

The TCC 140 may exit the text testing mode or otherwise return to normal text operating mode based on one or more criteria as described herein. Once back in normal operating mode, the TCC 140 may handle a subsequent emergency text from the UE 110 normally. Thus, the TCC 140 will, in response to receiving an emergency text from the UE 110 and represented by the signal path 185, determine the current UE location for the UE 110 and the appropriate PSAP for that location, in this example PSAP 170. The TCC 140 may then forward the emergency text from the UE 110 to the PSAP 170. The TCC 140 may also, or instead, further facilitate emergency communications between the UE 110 and the PSAP 170.

In another example, the UE 112 may initiate a voice testing operation by transmitting a voice testing request to the SMSC 130 via the base station 122. The signal path 182 may represent the path that such a request and related signals may take. The voice testing request from the UE 112 may include a short code (e.g., "933") that may cause the SMSC 130 to transmit the short code to one or more call routing nodes 150 for transmission to the GMLC 160. In response to receiving the short code, the GMLC 160 may enter an emergency voice testing mode for the UE 112. The GMLC 160 may reply with a confirmation message that may include voice testing mode data. The SMSC 130 may forward the reply to the UE 112 with a voice testing mode confirmation communication. This confirmation may indicate a confirmation of voice testing mode at the GMLC 160 for the UE 112 and/or one or more parameters, details, and/or other information associated with the voice testing mode. For example, the confirmation may explicitly indicate that the testing mode will be active for a particular number of test emergency texts, a particular amount of time, until another (same or different) short code is received, etc. The GMLC 160 may store an indicator of voice testing mode associated with an indicator of the UE 112 to maintain a record of voice testing mode for the UE 112. Here again, the indicator of the UE 112 may take any form, including a telephone number, an MSISDN, an IMSI, an MDN, etc. For example, the GMLC 160 may store an array of identifiers associated with UEs for which the GMLC 160 may be in voice testing mode.

While in voice testing mode for the UE 112, the GMLC 160 may perform testing operations in response to receiving an emergency voice communication from the UE 112. The signal path 184 may represent the path that such a test emergency voice call and related signals may take. For example, an operator of the UE 112 may request to initiate a voice call to an emergency number (e.g., 911). This request may be received at the call routing node(s) 150. The node(s) 150 may transmit a request for call routing information to the GMLC 160 (e.g., in response to determining that the call is an emergency communications). This request may include the location of the UE 112 as included in the request to initiate the call. The GMLC 160 may determine that it is in voice testing mode for the UE 112 based on the UE 112's identifier, may determine the UE 112's current location (e.g., based on the information received from the nodes(s) 150), and may determine the appropriate PSAP for the UE 112's current location, in this example, PSAP 172. Instead of setting up the emergency call, the GMLC 160 may reply to the UE 112 with a testing information communication (e.g., a voice communication and/or a text communication) that may indicate the determined PSAP, the determined current UE location, a timestamp, additional PSAP data, and/or other testing information.

The GMLC 160 may exit the voice testing mode or otherwise return to normal text operating mode based on one or more criteria as described herein. Once back in normal operating mode, the GMLC 160 may handle a subsequent emergency voice call from the UE 112 normally. Thus, the GMLC 160 will, in response to receiving a request to establish an emergency call from the UE 112 via call routing node(s) 150 and represented by the signal path 186, determine the current UE location for the UE 112 and the appropriate PSAP for that location, in this example PSAP 172. The GMLC 160 may then forward the call routing information for the PSAP 172 to the call routing nodes 150, which may use this information to establish an emergency call between the UE 112 and PSAP 172.

Illustrative Signal Flows

Figure 2:
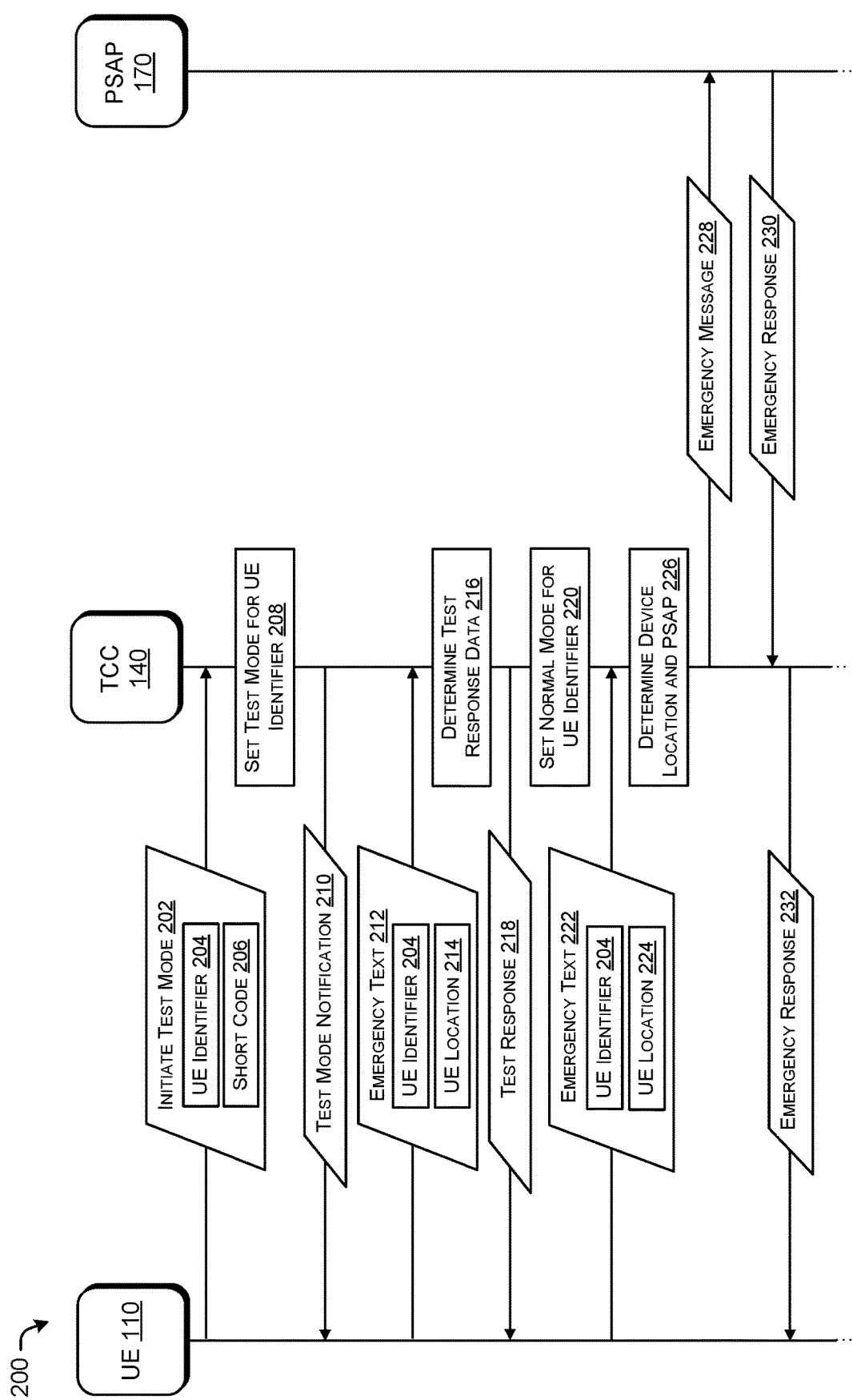
FIG. 2 is a diagram of an illustrative signal flow associated with systems and techniques for testing emergency text communications using short codes, in accordance with examples of the disclosure.

FIG. 2 illustrates an exemplary signal flow 200 of various messages that may be exchanged in one or more of the disclosed systems and techniques for more efficiently and accurately testing emergency communications operations using short codes. Reference will be made in this description of the signal flow 200 to devices, entities, and interfaces illustrated in FIG. 1 and described in regard to that figure. However, the operations, signals, and signal flow illustrated in FIG. 2 and described herein may be implemented in any suitable system and/or with any one or more suitable devices and/or entities. Moreover, any of the operations, signals, and/or entities described in regard to FIG. 2 may be used separately and/or in conjunction with other operations, signals, and/or entities. All such embodiments are contemplated as within the scope of the instant disclosure.

The UE 110 may transmit a test mode initiation request 202 to the TCC 140 (e.g., via one or more gNodeBs, SMSCs, and/or other wireless communications network components). The request 202 may include a UE identifier 204 for the UE 110. This identifier may be any one or more of a telephone number, an MSISDN, an MDN, an IMSI, etc. The request 202 may also include a short code 206 that may be a code that the TCC 140 may be configured to detect as a request to initiate a text testing mode for a UE indicated in a request that includes such a short code. For example, the request 202 may be a text message with a text body that includes the short code 206 (e.g., "922") and is associated with an originating device indicated by the UE identifier 204.

Based on receiving the request 202, the TCC 140 may determine at operation 208 that the request 202 includes the short code 206 that is associated with a text testing mode. In response to this determination, the TCC 140 may store an indication and/or other data that indicates that the TCC is to perform text testing mode operations for an emergency text received from the UE 110. For example, the TCC 140 may store an indication of the UE 110 and/or its identifier 204 in a list, array, and/or other data structure that may be associated with text testing mode. Further at 208, the TCC 140 may set a timer, counter, or other indicator or tracker of text testing mode operations. For example, the TCC 140 may be configured to remain in text testing mode for a particular UE for a particular amount of time (e.g., 1 minute, 5 minutes, etc.) and/or to process a particular number of emergency texts (e.g., 1, 2, 5, 10, etc.) using text testing operations for a particular UE before returning to normal operating mode for that UE. The TCC 140 may also, or instead, be configured to track one or more other criteria associated with text testing mode that may be used to (e.g., automatically) determine if and/or when to revert to normal operating mode for a particular UE. This may be important to ensure that text testing mode does not remain in place indefinitely for a particular UE, preventing legitimate use of that UE for emergency text communications.

The TCC 140 may generate and transmit a text mode notification 210 to the UE 110. The notification 210 may be a text message. The notification 210 may indicate that the TCC 140 has entered text testing mode for the UE 110, the time at which the TCC 140 entered text testing mode for the UE 110, a length of time that the TCC 140 will remain in text testing mode for the UE 110 (e.g., before reverting to normal operation), a number of emergency communications that the TCC 140 will process in text testing mode for the UE 110 (e.g., before reverting to normal operation), an identifier of the TCC 140, a reiteration of the UE identifier 204, a reiteration of the short code 206, and/or any other information that may be associated with the text testing mode and/or the involved components.

The UE 110 may transmit an emergency text 212 to the TCC 140. The emergency text 212 may include the UE identifier 204 and may also include a UE location 214 for the UE 110. The UE location 214 (and any other location indicated by a UE described herein) may take a standardized UE location data form (e.g., latitude and longitude) and/or any other form that may enable one or more components of a wireless communications network to determine a current location of a UE.

At operation 216, the TCC 140 may determine that the emergency text 212 is associated with the UE 110 based on the UE identifier 204. The TCC 140 may determine that it is in a text testing mode for the UE 110. Based on this determination, the TCC 140 may determine the UE location 214 based on the emergency text 212. Using the UE location 214, the TCC 140 may determine the location of the PSAP associated with that location (e.g., the PSAP that is geographically most proximate, among available PSAPs, to the UE location 214). The TCC 140 may further determine any other relevant test response data, such as any remaining text testing mode time, remaining emergency texts to be processed in testing mode, etc. The TCC 140 may transmit the determined PSAP and/or PSAP location, in some examples along with any other test response data, to the UE 110 in test response 218. Note that in some examples, the test response data determined at operation 216 may also, or instead, be provided to one or more other components and/or systems, such as a database configured to receive and store such testing data.

At operation 220, the TCC 140 may revert to normal mode for the UE 110 (e.g., for UE identifier 204). In examples, the TCC 140 may be configured to automatically revert to normal mode after processing one emergency text in text testing mode for the UE 110. In other examples, the TCC 140 may be configured to automatically revert to normal mode after processing a predetermined number of emergency texts in text testing mode for the UE 110, after a particular length of time has passed since entering text testing mode for the UE 110, after receiving another short code from the UE 110 (e.g., a dedicated "stop testing" short code or a repeat of the same testing short code), and/or based on any other criteria, conditions, or combination thereof.

The UE 110 may transmit an emergency text 222 to the TCC 140. The emergency text 222 may include the UE identifier 204 and may also include a UE location 224 for the UE 110 (e.g., that may be a different location than the UE location 214 as the UE 110 may have changed locations since transmitting the emergency text 212). At operation 226, the TCC 140 may determine that the emergency text 222 is associated with the UE 110 based on the UE identifier 204. The TCC 140 may determine that it is not in a text testing mode for the UE 110. Based on this determination, the TCC 140 may determine the UE location 224 based on the emergency text 212. Using the UE location 224, the TCC 140 may determine the location of the PSAP associated with that location (e.g., the PSAP that is geographically most proximate, among available PSAPs, to the UE location 224). In this example, the TCC 140 may determine the PSAP 170 is the most proximate PSAP to the UE location 224. The TCC 140 may then relay or otherwise transmit data associated with the emergency text 222 as emergency message 228 to the PSAP 170. The PSAP 170 may respond with an emergency response 230 that the TCC 140 may relay or otherwise transmit back to the UE 110 as an emergency response 232. Additional normal emergency communications operations may be performed.

Figure 3:
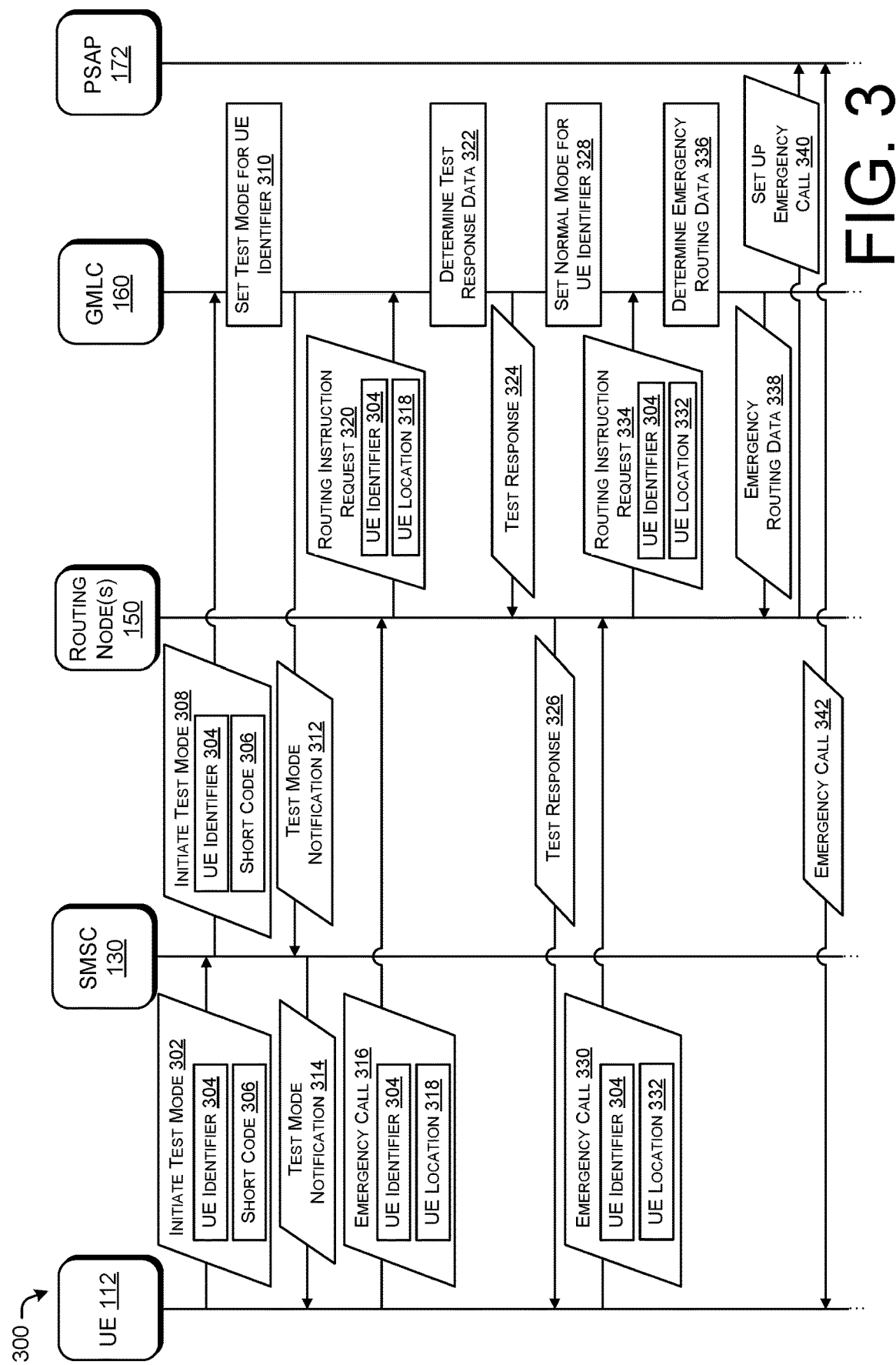
FIG. 3 is a diagram of an illustrative signal flow associated with systems and techniques for testing emergency voice communications using short codes, in accordance with examples of the disclosure.

FIG. 3 illustrates an exemplary signal flow 300 of various messages that may be exchanged in one or more of the disclosed systems and techniques for more efficiently and accurately testing emergency communications operations using short codes. Reference will be made in this description of the signal flow 300 to devices, entities, and interfaces illustrated in FIG. 1 and described in regard to that figure. However, the operations, signals, and signal flow illustrated in FIG. 3 and described herein may be implemented in any suitable system and/or with any one or more suitable devices and/or entities. Moreover, any of the operations, signals, and/or entities described in regard to FIG. 3 may be used separately and/or in conjunction with other operations, signals, and/or entities. All such embodiments are contemplated as within the scope of the instant disclosure.

The UE 112 may transmit a test mode initiation request 302 to the SMSC 130 (e.g., via one or more gNodeBs and/or other wireless communications network components). The request 302 may include a UE identifier 304 for the UE 112. This identifier may be any one or more of a telephone number, an MSISDN, an MDN, an IMSI, etc. The request 302 may also include a short code 306 that may be a code that represents a request to initiate a voice testing mode for a UE indicated in a request that includes such a short code. For example, the request 302 may be a text message with a text body that includes the short code 306 (e.g., "933") and is associated with an originating device indicated by the UE identifier 304.

Based on receiving the request 302, the SMSC 130 may determine that the request 302 includes the short code 306 that is associated with a voice testing mode. In response to this determination, the SMSC 130 may transmit a request 308 to initiate voice testing mode for the UE 112 (as identified by UE identifier 204 in the request 308) to the GMLC 160. Alternatively, the SMSC 130 may relay the request 302 as the request 308 to the GMLC 160. The request 308 may include the short code 306 and/or any other instructions or data that may be recognized by the GMLC 160 as an instruction to enter a voice testing mode for the UE identified in the request 308. The GMLC 160, at operation 310 in response to the request 308, may store an indication and/or other data that indicates that the GMLC 160 is to perform voice testing mode operations for emergency voice calls received from the UE 112. For example, the GMLC 160 may store an indication of the UE 112 and/or its identifier 304 in a list, array, and/or other data structure that may be associated with voice testing mode. Further at 310, the GMLC 160 may set a timer, counter, or other indicator or tracker of voice testing mode operations. For example, the GMLC 160 may be configured to remain in voice testing mode for a particular UE for a particular amount of time (e.g., 1 minute, 5 minutes, etc.) and/or to process a particular number of emergency calls (e.g., 1, 2, 5, 10, etc.) using voice testing operations for a particular UE before returning to normal operating mode for that UE. The GMLC 160 may also, or instead, be configured to track one or more other criteria associated with voice testing mode that may be used to (e.g., automatically) determine if and/or when to revert to normal operating mode for a particular UE. This may be important to ensure that voice testing mode does not remain in place indefinitely for a particular UE, preventing legitimate use of that UE for emergency voice communications.

The GMLC 160 may generate and transmit a voice mode notification 312 to the SMSC 130 that the SMSC 130 may use to generate and transmit an associated voice mode notification 314 to UE 112. Alternatively, the SMSC 130 may relay the notification 312 as the notification 314 to the UE 112. Either or both of the notifications 312 and 314 may be a text message. Either or both of the notifications 312 and 314 may indicate that the GMLC 160 has entered voice testing mode for the UE 112, the time at which the GMLC 160 entered voice testing mode for the UE 112, a length of time that the GMLC 160 will remain in voice testing mode for the UE 112 (e.g., before reverting to normal operation), a number of emergency voice communications that the GMLC 160 will process in voice testing mode for the UE 112 (e.g., before reverting to normal operation), an identifier of the GMLC 160, a reiteration of the UE identifier 304, a reiteration of the short code 306, and/or any other information that may be associated with the voice testing mode and/or the involved components.

The UE 112 may transmit an emergency call request 316 to the routing node(s) 150 (the TCC 140 may not be involved in voice communications). The emergency call request 316 may include the UE identifier 304 and may also include a UE location 318 for the UE 112. The UE location 318 (and any other location indicated by a UE described herein) may take a standardized UE location data form (e.g., latitude and longitude) and/or any other form that may enable one or more components of a wireless communications network to determine a current location of a UE.

In response to the call request 316, the routing node(s) 150 may transmit a request 320 for routing instructions to the GMLC 160. For example, the routing node(s) 150 may determine, in response to receiving a request to set up an emergency call, that it will need a PSAP location to use as a destination for the call. The routing node(s) 150 may then query the GMLC 160 using the request 320 for a PSAP location (e.g., identifier, network address, geographical location, etc.). The request 320 may include the UE identifier 304 and the UE location 318 and/or other data representative thereof.

At operation 322, the GMLC 160 may determine that the request 320 for routing instructions is associated with the UE 112 based on the UE identifier 304. The GMLC 160 may determine that it is in a voice testing mode for the UE 112. Based on this determination, the GMLC 160 may determine the UE location 318 based on the request 320. Using the UE location 318, the GMLC 160 may determine the location of the PSAP associated with that location (e.g., the PSAP that is geographically most proximate, among available PSAPs, to the UE location 318). The GMLC 160 may further determine any other relevant test response data, such as any remaining voice testing mode time, remaining emergency calls to be processed in testing mode, etc. The GMLC 160 may transmit the determined PSAP and/or PSAP location, in some examples along with any other test response data, to the routing node(s) 150 as test response 324. The routing node(s) may forward or otherwise convey this test response data to the UE 112 as test response 326. In examples, the test responses 324 and 326 may take the form of a voice message (e.g., automatically generated voice message or announcement) that indicates the test response data and that may be played or otherwise presented to the operator of the UE 112. In other examples, the test responses 324 and 326 may represent operations that may be taken to provide a text message or other type of representation of the test response data to the UE 112. Note that in some examples, the test response data determined at operation 322 may also, or instead, be provided to one or more other components and/or systems, such as a database configured to receive and store such testing data.

At operation 328, the GMLC 160 may revert to normal mode for the UE 112 (e.g., for UE identifier 304). In examples, the GMLC 160 may be configured to automatically revert to normal mode after processing one emergency call in voice testing mode for the UE 112. In other examples, the GMLC 160 may be configured to automatically revert to normal mode after processing a predetermined number of emergency calls in voice testing mode for the UE 112, after a particular length of time has passed since entering voice testing mode for the UE 112, after receiving another short code from the UE 112 (e.g., a dedicated "stop testing" short code or a repeat of the same testing short code), and/or based on any other criteria, conditions, or combination thereof.

The UE 112 may transmit an emergency call request 330 to the routing node(s) 150. The emergency call request 330 may include the UE identifier 304 and may also include a UE location 332 for the UE 112 (e.g., that may be a different location than the UE location 318 as the UE 112 may have changed locations since transmitting the emergency text 212). In response to the call request 330, the routing node(s) 150 may transmit a request 334 for routing instructions to the GMLC 160. For example, the routing node(s) 150 may determine, in response to receiving a request to set up an emergency call, that it will need a PSAP location to use as a destination for the call. The routing node(s) 150 may then query the GMLC 160 using the request 334 for a PSAP location (e.g., identifier, network address, geographical location, etc.). The request 320 may include the UE identifier 304 and the UE location 332 and/or other data representative thereof.

At operation 336, the GMLC 160 may determine that the request 334 for routing instructions is associated with the UE 112 based on the UE identifier 304. The GMLC 160 may determine that it is not in a voice testing mode for the UE 112. Based on this determination, the GMLC 160 may determine the UE location 318 based on the request 334. Using the UE location 332, the GMLC 160 may determine the location of the PSAP associated with that UE location (e.g., the PSAP that is geographically most proximate, among available PSAPs, to the UE location 332). In this example, the GMLC 160 may determine that the PSAP 172 is the most proximate PSAP the location indicated by UE location 332. The GMLC 160, at operation 336, may further determine any other relevant routing instruction data and/or any other emergency communications data that may be used for establishing an emergency call between the UE 112 and the PSAP 172. The GMLC 160 may transmit the determined PSAP and/or PSAP location, in some examples along with any other test response data, to the routing node(s) 150 as emergency routing data 338. The routing node(s) use the emergency routing data 338 to transmit a request 340 to the PSAP 172 to establish an emergency call with the UE 112. The emergency call 342 may then be established between the PSAP 172 and the UE 112. Additional normal emergency communications operations may be performed.

Illustrative Operations

Figure 4:
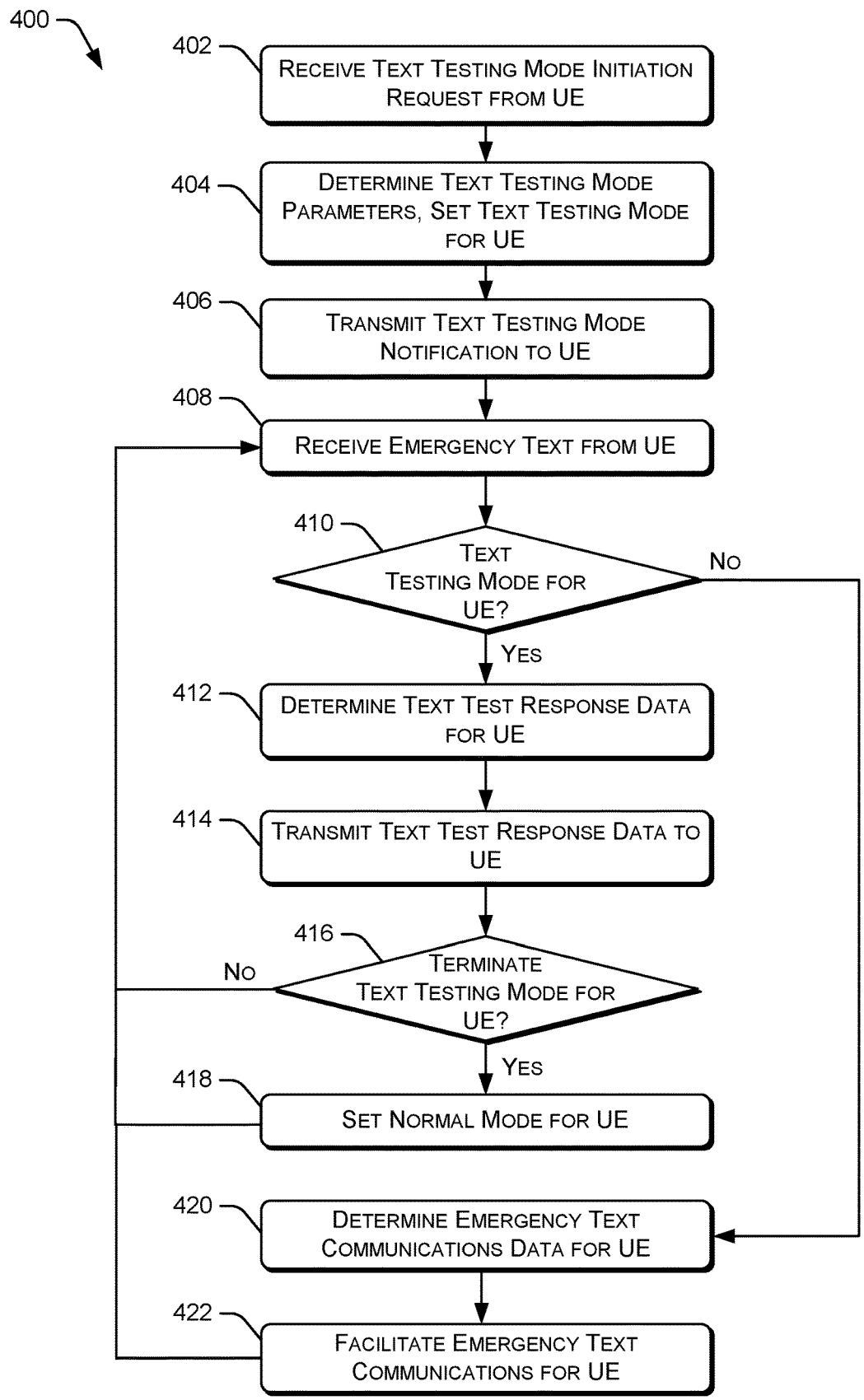
FIG. 4 is a flow diagram of an illustrative process for performing testing of emergency text communications using short codes, in accordance with examples of the disclosure.

FIG. 4 shows a flow diagram of an illustrative process 400 for performing emergency communications testing using short codes according to the disclosed embodiments. The process 400 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 400 may be described with reference to the wireless network environment 100 of FIG. 1; however other environments may also be used.

At block 402, a component of a wireless communications network, such as a TCC, may receive a text testing mode initiation request from a UE. This request may include a particular text short code that may be associated with text testing mode. As noted, such short codes may take any form (e.g., "922"). This request may also include an identifier of the originating UE.

At block 404, the TCC may determine one or more text testing mode parameters. For example, the TCC may determine a number of texts to be processed before reverting to normal mode, a length of time to remain in text testing mode before (e.g., automatically) reverting to normal mode, etc. Further at block 404, the TCC may enter a text testing mode for communications originating with the UE that sent the text testing mode short code received at 402. The TCC may store an indication of the UE in a data structure associated with text testing mode as described herein and/or may set a counter or timer as described herein to track text testing mode operations (e.g., to determine when to exit text testing mode).

At block 406, the TCC may reply to the originating UE with a testing mode confirmation communication that may include one or more parameters, details, and/or other information associated with the text testing mode. For example, the TCC may reply with a text message that indicates that text testing mode has begun for the requesting UE and a number of processed emergency texts and/or a length of time until the TCC will revert to normal operation.

At block 408, the TCC may receive an emergency text from a UE. The TCC may determine, at block 410, if it is in text testing mode for the UE associated with the emergency text. For example, the TCC may determine whether the emergency text was received from the UE that initially transmitted the text testing mode initiation request received at block 402. If the TCC is not in text testing mode for the UE associated with the emergency text, the process may move to block 420 for the TCC to process the emergency text normally.

If, at block 410, the TCC determines that it is in text testing mode for the UE associated with the emergency text received at 408, at block 412 the TCC may determine text test response data based on the UE and the emergency text. For example, the TCC may determine the UE's current location (e.g., as indicated in the emergency text). The TCC may then determine the appropriate PSAP for the UE's current location. The TCC may also, or instead, determine other responsive testing data. At block 414, the TCC may transmit this responsive data (e.g., in a text message) to the UE associated with the received emergency text. In this responsive message, the TCC may also indicate other information as described herein (e.g., the determined current UE location, a timestamp, additional PSAP data, remaining testing texts to process, remaining time in test testing mode, etc.).

At block 416 the TCC may determine whether to exit text testing mode for the UE associated with the emergency text received at 408. In various examples, the TCC may exit the text testing mode or otherwise return to normal text operating mode after responding to a threshold number (e.g., 1, 2, 3, 20, etc.) of emergency texts. Alternatively or additionally, the TCC may exit the text testing mode or otherwise return to normal text operating mode after a threshold period of time (e.g., 5 minutes, 10 minutes, 1 hour, etc.) has passed, in some examples, regardless of the number of emergency texts processed in text testing mode. Alternatively or additionally, the TCC may exit the text testing mode or otherwise return to normal text operating mode after receiving another short code from the originating UE. Any other criteria may be used to determine whether to continue in a text testing mode for a particular UE by a TCC.

If the TCC determines to remain in text testing mode for the particular UE at block 416, the process 400 may return to block 408 to receive additional emergency texts for processing. If the TCC determines to exit text testing mode for the particular UE at block 416, the process 400 may proceed to block 418 where the TCC may set the particular UE to normal mode for future emergency text processing operations. The process 400 may return to block 408 to receive additional emergency texts for processing.

If the TCC is not in text testing mode and has received an emergency text, for example, at block 408, the process 400 may proceed to block 420 where the TCC may determine the UE's location and the appropriate PSAP for that location. The TCC may, at block 422 and in response to receiving the emergency text and determining the appropriate PSAP, facilitate emergency text communications between the UE and the PSAP.

Figure 5:
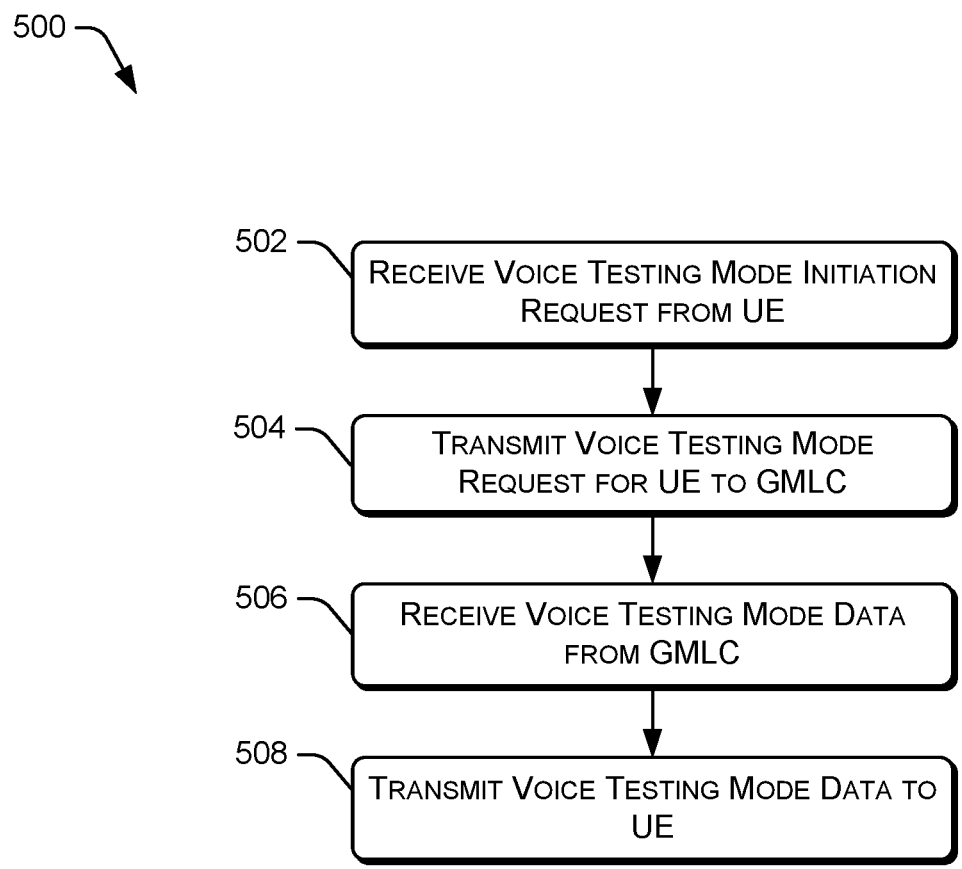
FIG. 5 is a flow diagram of an illustrative process for performing testing of emergency voice communications using short codes, in accordance with examples of the disclosure.

FIG. 5 shows a flow diagram of an illustrative process 500 for performing emergency communications testing using short codes according to the disclosed embodiments. The process 500 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 500 may be described with reference to the wireless network environment 100 of FIG. 1; however other environments may also be used.

At block 502, a component of a wireless communications network, such as an SMSC, may receive a voice testing mode initiation request from a UE. This request may include a particular text short code that may be associated with voice testing mode. As noted, such short codes may take any form (e.g., "933"). This request may also include an identifier of the originating UE.

At block 504, the SMSC may transmit a request to a GMLC to initiate voice testing mode for the UE associated with the request received at block 502. This request to the GMLC may include the UE identifier and an instruction to initiate the voice testing mode. For example, this request may be simply a relay of the request received at block 502. Alternatively, this request may be a request generated by the SMSC based on the request received at block 502. The request to the GMLC may include the short code received at block 502 and/or instruction of another form that may cause the GMLC to enter voice testing mode for the UE.

At block 506, the SMSC may receive a confirmation of voice testing mode from the GMLC. This confirmation may include other information, such as a length of time the GMLC will remain in voice testing mode for the UE, a number of calls the GMLC will process in testing mode, a timestamp when the GMLC entered testing mode for the UE, etc.

At block 508, the SMSC may reply back to the originating UE with a voice testing mode confirmation communication that may include one or more parameters, details, and/or other information associated with the voice testing mode, such as those received from the GMLC at block 506. For example, the SMSC may generate a text message that indicates that voice testing mode has begun for the requesting UE at the GMLC and a number of processed emergency calls and/or a length of time until the GMLC will revert to normal operation. Alternatively, the SMSC may relay the confirmation message received from the GMLC at block 506.

Figure 6:
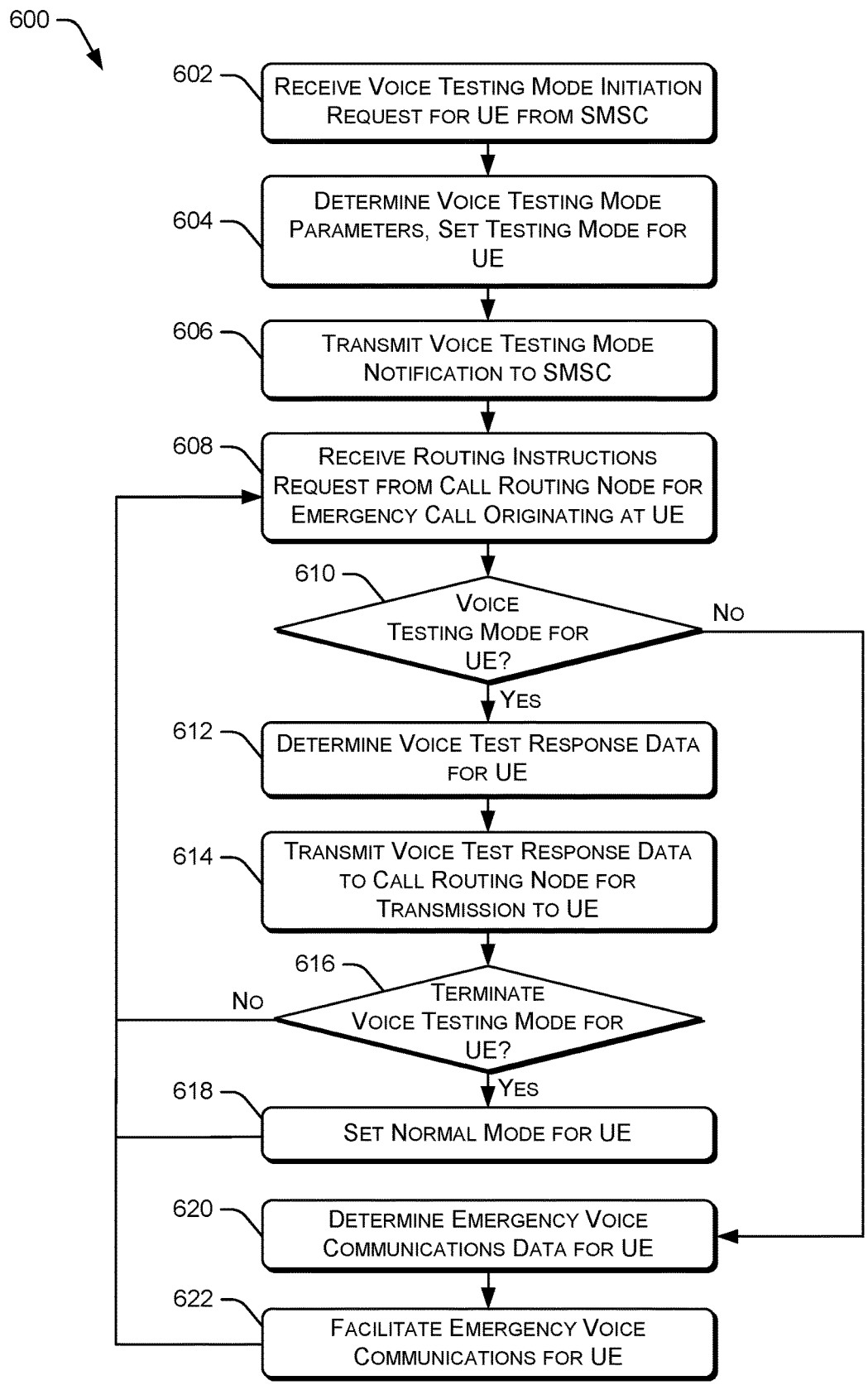
FIG. 6 is a flow diagram of an illustrative process for performing testing of emergency voice communications using short codes, in accordance with examples of the disclosure.

FIG. 6 shows a flow diagram of an illustrative process 600 for performing emergency communications testing using short codes according to the disclosed embodiments. The process 600 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 600 may be described with reference to the wireless network environment 100 of FIG. 1; however other environments may also be used.

At block 602, a component of a wireless communications network, such as a GMLC, may receive a voice testing mode initiation request from an SMSC (e.g., originating at a UE and generated, transmitted and/or relayed in process 500 of FIG. 5). This request may include an instruction to begin voice testing mode for a particular UE. For example, the request may include a particular short code that may be associated with voice testing mode (or any other form of voice testing mode instruction) and an identifier of the UE.

At block 604, the GMLC may determine one or more voice testing mode parameters. For example, the GMLC may determine a number of calls to be processed before reverting to normal mode, a length of time to remain in voice testing mode before (e.g., automatically) reverting to normal mode, etc. Further at block 604, the GMLC may enter a voice testing mode for communications originating with the UE indicated in the voice testing mode initiation request received at 602. The GMLC may store an indication of the UE in a data structure associated with voice testing mode as described herein and/or may set a counter or timer as described herein to track voice testing mode operations (e.g., to determine when to exit voice testing mode).

At block 606, the GMLC may reply back to the SMSC with a testing mode confirmation communication that may include one or more parameters, details, and/or other information associated with the voice testing mode. For example, the GMLC may reply with a text message or text message content that indicates that text testing mode has begun for the requesting UE and a number of processed emergency calls and/or a length of time until the GMLC will revert to normal operation. The recipient SMSC may relay this message to the UE or use this data to generate a (e.g., text) notification to the requesting UE.

At block 608, the GMLC may receive a request from one or more routing nodes for routing instructions for an emergency call originating at a UE. This request may include an identifier of the UE requesting establishment of the emergency call and location data for that UE. The GMLC may determine, at block 610, if it is in voice testing mode for the UE associated with the emergency call. For example, the GMLC may determine whether the emergency call request was received from the UE that initially transmitted the voice testing mode initiation request that triggered the request received at block 602. If the GMLC is not in voice testing mode for the UE associated with the emergency call request, the process may move to block 620 for the GMLC to process the request for emergency call routing information normally.

If, at block 610, the GMLC determines that it is in voice testing mode for the UE associated with the emergency call for which routing instructions have been requested at 608, at block 612 the GMLC may determine voice test response data based on the UE and the emergency call routing instructions request. For example, the GMLC may determine the UE's current location (e.g., as indicated in the emergency call routing instructions request). The GMLC may then determine the appropriate PSAP for the UE's current location. The GMLC may also, or instead, determine other responsive testing data. At block 614, the GMLC may transmit this responsive data (e.g., as a voice message or announcement) to the UE associated with the requested emergency call (e.g., via one or more routing nodes). In this responsive message, the GMLC may also indicate other information as described herein (e.g., the determined current UE location, a timestamp, additional PSAP data, remaining testing calls to process, remaining time in voice testing mode, etc.).

At block 616 the GMLC may determine whether to exit voice testing mode for the UE associated with the emergency calling routing instructions request received at 608. In various examples, the GMLC may exit the voice testing mode or otherwise return to normal voice operating mode after responding to a threshold number (e.g., 1, 2, 3, 20, etc.) of requests for emergency call routing instructions. Alternatively or additionally, the GMLC may exit the voice testing mode or otherwise return to normal voice operating mode after a threshold period of time (e.g., 5 minutes, 10 minutes, 1 hour, etc.) has passed, in some examples, regardless of the number of requests for emergency call routing instructions processed in voice testing mode. Alternatively or additionally, the GMLC may exit the voice testing mode or otherwise return to normal voice operating mode after receiving another instruction from a UE via an SMSC. Any other criteria may be used to determine whether to continue in a voice testing mode for a particular UE by a GMLC.

If the GMLC determines to remain in voice testing mode for the particular UE at block 616, the process 600 may return to block 608 to receive additional requests for emergency call routing instructions for processing. If the GMLC determines to exit voice testing mode for the particular UE at block 616, the process 600 may proceed to block 618 where the GMLC may set the particular UE to normal mode for future requests for emergency call routing instruction request processing operations. The process 600 may return to block 608 to receive and process additional requests for emergency call routing instructions.

If the GMLC is not in voice testing mode and has received a request for emergency call routing instructions, for example, at block 608, the process 600 may proceed to block 620 where the GMLC may determine the UE's location and the appropriate PSAP for that location. The GMLC may, at block 622 and in response to receiving the routing instructions request and determining the appropriate PSAP, facilitate emergency voice communications between the UE and the PSAP, for example, by providing the routing instructions to one or more call routing nodes so that an emergency call may be established.

In summary, by more efficiently and accurately testing emergency communications operations and components without disrupting operational emergency services systems and personnel, the disclosed systems and techniques may be able to increase the efficiency of usage of emergency resources and wireless network resources, improving the user experience and performance of both the network and user devices.

Example User Equipment

Figure 7:
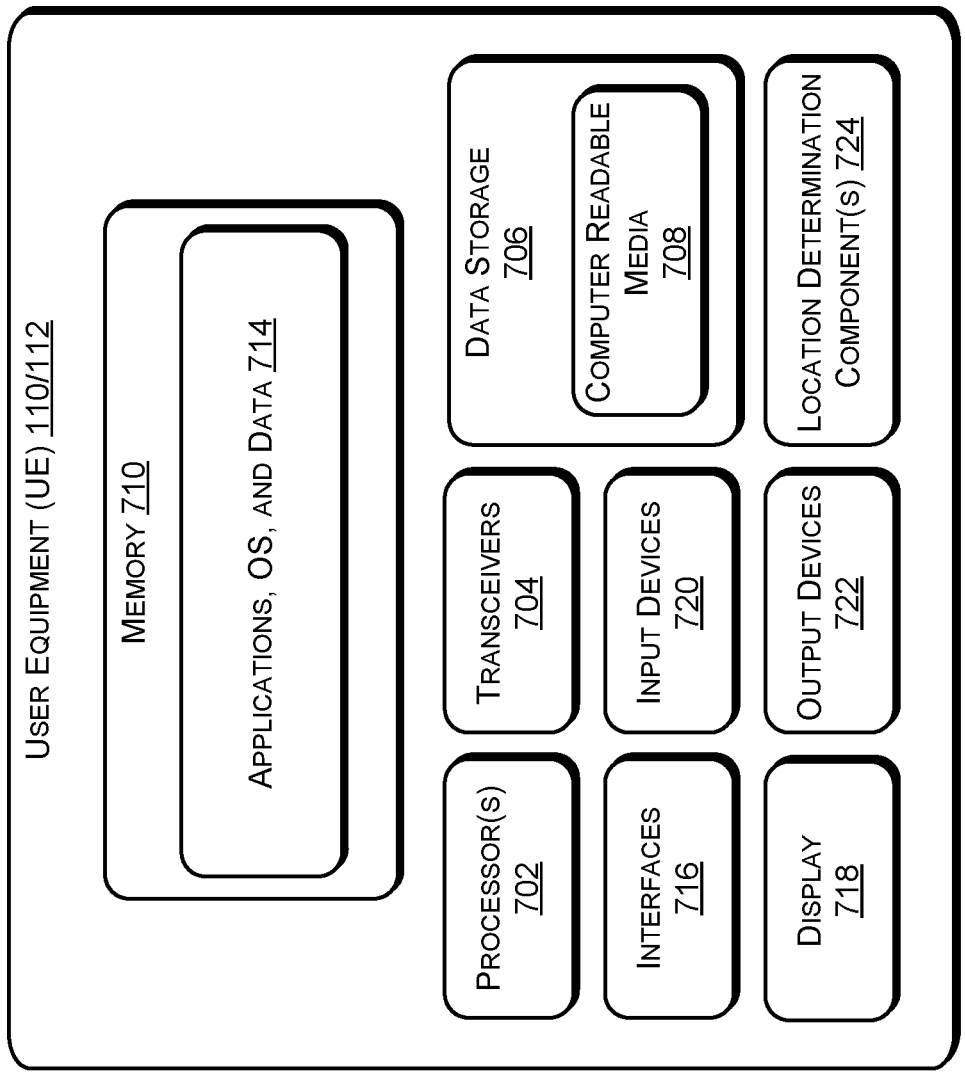
FIG. 7 is a schematic diagram of illustrative components in an example user device that is configured for testing emergency communications using short codes, in accordance with examples of the disclosure.

FIG. 7 is an example of a UE, such as UE 110 or UE 112, for use with the systems and methods disclosed herein, in accordance with some examples of the present disclosure. The UE 110/112 may include one or more processors 702, one or more transmit/receive antennas (e.g., transceivers or transceiver antennas) 704, and a data storage 706. The data storage 706 may include a computer readable media 708 in the form of memory and/or cache. This computer-readable media may include a non-transitory computer-readable media. The processor(s) 702 may be configured to execute instructions, which can be stored in the computer readable media 708 and/or in other computer readable media accessible to the processor(s) 702. In some configurations, the processor(s) 702 is a Central Processing Unit (CPU), a Graphics Processing Unit (GPU), or both CPU and GPU, or any other sort of processing unit. The transceiver antenna(s) 704 can exchange signals with a base station, such as base stations 120 and 122.

The UE 110/112 may be configured with a memory 710. The memory 710 may be implemented within, or separate from, the data storage 706 and/or the computer readable media 708. The memory 710 may include any available physical media accessible by a computing device to implement the instructions stored thereon. For example, the memory 710 may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which may be used to store the desired information and which may be accessed by the UE 110/112.

The memory 710 can store several modules, such as instructions, data stores, and so forth that are configured to execute on the processor(s) 702. In configurations, the memory 710 may also store one or more applications 714 configured to receive and/or provide voice, data, and messages (e.g., SMS messages, Multi-Media Message Service (MMS) messages, Instant Messaging (IM) messages, Enhanced Message Service (EMS) messages, etc.) to and/or from another device or component (e.g., the base stations 120 and 122). The applications 714 may also include one or more operating systems and/or one or more third-party applications that provide additional functionality to the UE 110/112.

Figure 8:
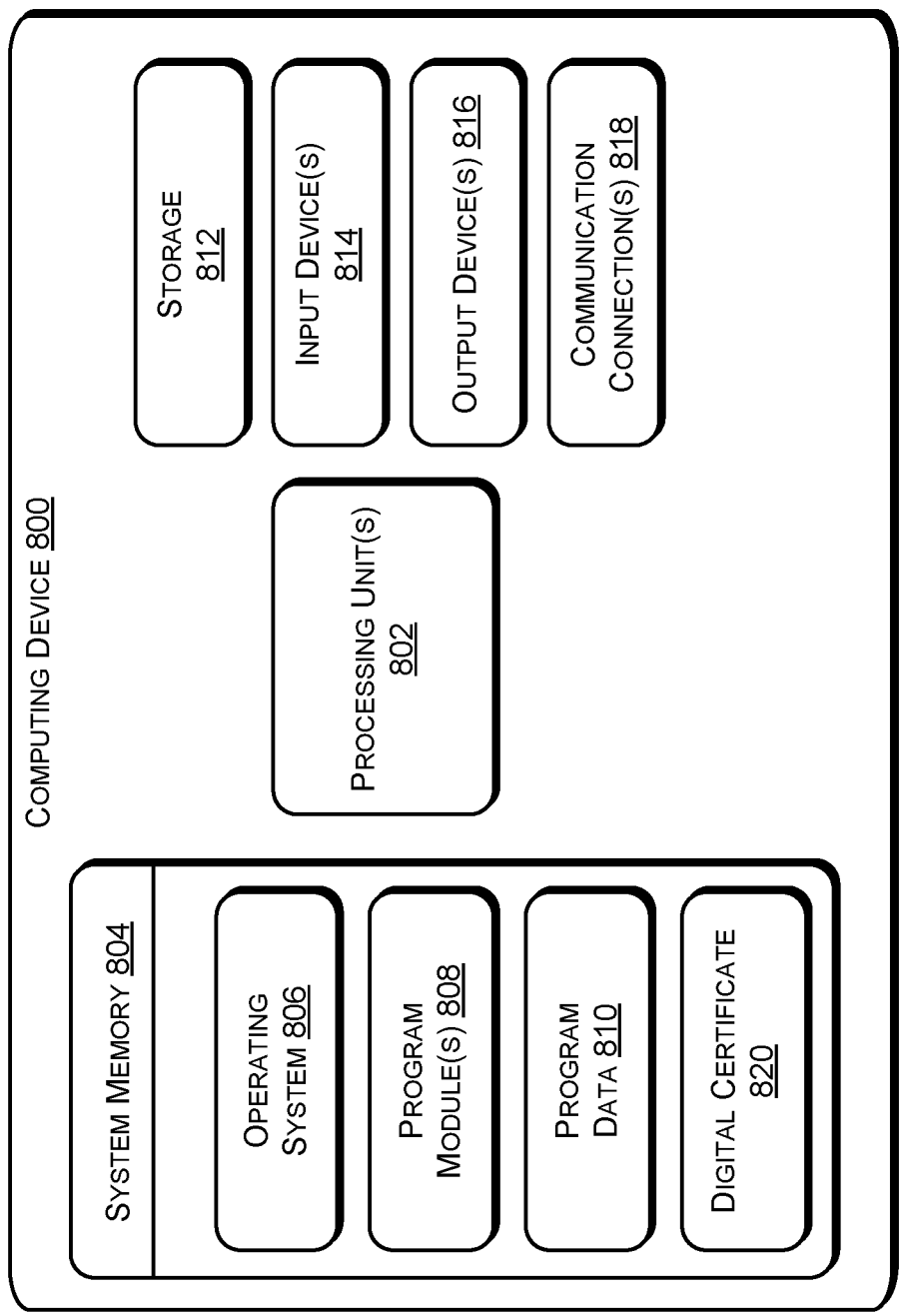
FIG. 8 is a schematic diagram of illustrative components in an example computing device that is configured for testing emergency communications using short codes, in accordance with examples of the disclosure.

Although not all illustrated in FIG. 8, the UE 110/112 may also comprise various other components, e.g., a battery, a charging unit, one or more network interfaces 716, an audio interface, a display 718, a keypad or keyboard, and one or more input devices 720, and one or more output devices 722. The UE 110/112 may further include one or more location determination components 724 that may be configured to determine a current UE location that may be used as described herein for testing emergency communications operations and components.

Example Computing Device

FIG. 8 is an example of a computing device 800 for use with the systems and methods disclosed herein, in accordance with some examples of the present disclosure. The computing device 800 can be used to implement various components of a core network, a base station, and/or any servers, routers, gateways, gateway elements, administrative components, etc. that can be used by a communication provider. One or more computing devices 800 can be used to implement the network 101, for example. One or more computing devices 800 can also be used to implement base stations and other components.

In various embodiments, the computing device 800 can include one or more processing units 802 and system memory 804. Depending on the exact configuration and type of computing device, the system memory 804 can be volatile (such as RAM), nonvolatile (such as ROM, flash memory, etc.) or some combination of the two. The system memory 804 can include an operating system 806, one or more program modules 808, program data 810, and one or more digital certificates 820. The system memory 804 may be secure storage or at least a portion of the system memory 804 can include secure storage. The secure storage can prevent unauthorized access to data stored in the secure storage. For example, data stored in the secure storage can be encrypted or accessed via a security key and/or password.

The computing device 800 can also include additional data storage devices (removable and/or non-removable) such as, for example, magnetic disks, optical disks, or tape. Such additional storage is illustrated in FIG. 8 by storage 812.

Non-transitory computer storage media of the computing device 800 can include volatile and nonvolatile, removable and non-removable media implemented in any method or technology for storage of information, such as computer readable instructions, data structures, program modules, or other data. The system memory 804 and storage 812 are examples of computer readable storage media. Non-transitory computer readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 800. Any such non-transitory computer readable storage media can be part of the computing device 800.

In various embodiment, any or all of the system memory 804 and storage 812 can store programming instructions which, when executed, implement some or all of the functionality described above as being implemented by one or more systems configured in the environment 100 and/or components of the network 101.

The computing device 800 can also have one or more input devices 814 such as a keyboard, a mouse, a touch-sensitive display, voice input device, etc. The computing device 800 can also have one or more output devices 816 such as a display, speakers, a printer, etc. can also be included. The computing device 800 can also contain one or more communication connections 818 that allow the device to communicate with other computing devices using wired and/or wireless communications.

EXAMPLE CLAUSES

The following paragraphs describe various examples. Any of the examples in this section may be used with any other of the examples in this section and/or any of the other examples or embodiments described herein.

A: A method performed by a text control center (TCC), the method comprising: receiving, at the TCC from a user equipment (UE), a first text message comprising a short code associated with an emergency communications testing mode; initiating, at the TCC based at least in part on the short code, the emergency communications testing mode for the UE at the TCC; receiving, at the TCC from the UE, an emergency text message; determining, at the TCC, that the TCC is in the emergency communications testing mode for the UE; based at least in part on determining that the TCC is in the emergency communications testing mode for the UE: determining a location for the UE based at least in part on the emergency text message; determining a public safety access point (PSAP) based at least in part on the location; and transmitting, from the TCC to the UE, a second text message comprising an indication of the PSAP; and terminating, at the TCC, the emergency communications testing mode for the UE.

B: The method of paragraph A, further comprising: receiving, at the TCC from the UE, a second emergency text message; determining, at the TCC, that the TCC is not in the emergency communications testing mode for the UE; and based at least in part on determining that the TCC is not in the emergency communications testing mode for the UE: determining a second location for the UE based at least in part on the second emergency text message; determining a second PSAP based at least in part on the second location; and transmitting, from the TCC to the second PSAP, the second emergency text message.

C: The method of paragraph A or B, wherein terminating the emergency communications testing mode for the UE at the TCC is based at least in part on transmitting the second text message.

D: The method of any of paragraphs A-C, wherein terminating the emergency communications testing mode for the UE at the TCC is based at least in part on determining that a threshold amount of time has passed since initiating the emergency communications testing mode.

E: The method of any of paragraphs A-D, wherein terminating the emergency communications testing mode for the UE at the TCC is based at least in part on receiving a second short code associated with terminating the emergency communications testing mode.

F: The method of any of paragraphs A-E, wherein determining the location for the UE comprises determining a latitude and a longitude for the UE represented in the emergency text message.

G: A gateway mobile location center (GMLC) comprising: one or more processors; one or more transceivers; and non-transitory computer-readable media storing computer-executable instructions that, when executed by the one or more processors, cause the one or more processors to perform operations comprising: receiving, at the GMLC from a text control center (TCC), an instruction to initiate an emergency communications testing mode for a user equipment (UE) at the GMLC; initiating the emergency communications testing mode for the UE at the GMLC; receiving, at the GMLC from a call routing node, a request for routing instructions for an emergency call requested by the UE; determining, at the GMLC, that the GMLC is in the emergency communications testing mode for the UE; based at least in part on determining that the GMLC is in the emergency communications testing mode for the UE: determining a location for the UE based at least in part on the request for the routing instructions; determining a public safety access point (PSAP) based at least in part on the location; and transmitting, from the GMLC to the UE, a message comprising an indication of the PSAP; and terminating the emergency communications testing mode for the UE at the GMLC.

H: The GMLC of paragraph G, wherein the instruction to initiate the emergency communications testing mode comprises a short code associated with the emergency communications testing mode.

I: The GMLC of paragraph G or H, wherein the message comprising the indication of the PSAP comprises a voice message comprising the indication of the PSAP.

J: The GMLC of any of paragraphs G-I, wherein initiating the emergency communications testing mode comprises starting a timer at the GMLC.

K: The GMLC of any of paragraphs G-J, wherein terminating the emergency communications testing mode for the UE comprises: determining, based at least in part on the timer, that a threshold amount of time has passed since initiating the emergency communications testing mode; and terminating the emergency communications testing mode for the UE based at least in part on determining that the threshold amount of time has passed.

L: The GMLC of any of paragraphs G-K, wherein the operations further comprise: receiving, at the GMLC from a second call routing node, a second request for second routing instructions for a second emergency call requested by the UE; determining that the GMLC is not in the emergency communications testing mode for the UE; and based at least in part on determining that the GMLC is not in the emergency communications testing mode for the UE: determining a second location for the UE based at least in part on the second request for routing instructions; determining a second PSAP based at least in part on the second location; and transmitting, from the GMLC to the second call routing node, the second routing instructions comprising an indication of the second PSAP.

M: The GMLC of any of paragraphs G-L, wherein terminating the emergency communications testing mode for the UE is based at least in part on transmitting the message comprising the indication of the PSAP.

N: The GMLC of any of paragraphs G-M, wherein: the operations further comprise receiving a second instruction to terminate the emergency communications testing mode for the UE at the GMLC; and terminating the emergency communications testing mode for the UE is based at least in part on the second instruction.

O: A non-transitory computer-readable media storing computer-executable instructions that, when executed by one or more processors, cause the one or more processors to perform operations comprising: receiving, at a wireless communications network component from a user equipment (UE), a text message comprising a short code associated with an emergency communications testing mode; initiating, at the wireless communications network component based at least in part on the short code, the emergency communications testing mode for the UE; receiving emergency communications from the UE; determining that the UE is associated with the emergency communications testing mode; based at least in part on determining that the UE is associated with the emergency communications testing mode: determining a location for the UE based at least in part on the emergency communications; determining a public safety access point (PSAP) based at least in part on the location; and transmitting an indication of the PSAP to the UE; and terminating the emergency communications testing mode for the UE.

P: The non-transitory computer-readable media of paragraph O, wherein initiating the emergency communications testing mode for the UE comprises transmitting an instruction to a gateway mobile location center (GMLC) to initiate the emergency communications testing mode for the UE at the GMLC.

Q: The non-transitory computer-readable media of paragraph O or P, wherein terminating the emergency communications testing mode for the UE comprises: receiving a second text message comprising the short code; and terminating the emergency communications testing mode for the UE based at least in part on receiving the second text message.

R: The non-transitory computer-readable media of any of paragraphs O-Q, wherein determining the location for the UE comprises determining a latitude and longitude for the UE from the emergency communications.

S: The non-transitory computer-readable media of any of paragraphs O-R, wherein initiating the emergency communications testing mode for the UE comprises: determining an identifier for the UE from the text message; and associating the identifier for the UE with the emergency communications testing mode.

T: The non-transitory computer-readable media of any of paragraphs O-S, wherein terminating the emergency communications testing mode for the UE is based at least in part on determining that a threshold amount of time has passed since initiating the emergency communications testing mode.

While the example clauses described above are described with respect to one particular implementation, it should be understood that, in the context of this document, the content of the example clauses can also be implemented via a method, device, system, computer-readable medium, and/or another implementation. Additionally, any of the examples A-T can be implemented alone or in combination with any other one or more of the examples A-T.

CONCLUSION

Depending on the embodiment, certain operations, acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, components, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and components described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method performed by a text control center (TCC), the method comprising:
   receiving, at the TCC from a user equipment (UE), a first text message comprising a short code associated with an emergency communications testing mode;
   initiating, at the TCC based at least in part on the short code, the emergency communications testing mode for the UE at the TCC;
   receiving, at the TCC from the UE, an emergency text message;
   determining, at the TCC, that the TCC is in the emergency communications testing mode for the UE;
   based at least in part on determining that the TCC is in the emergency communications testing mode for the UE:
      determining a location for the UE based at least in part on the emergency text message;
      determining a public safety access point (PSAP) based at least in part on the location; and
      transmitting, from the TCC to the UE, a second text message comprising an indication of the PSAP; and
   terminating, at the TCC, the emergency communications testing mode for the UE.

2. The method of claim 1, further comprising:
   receiving, at the TCC from the UE, a second emergency text message;
   determining, at the TCC, that the TCC is not in the emergency communications testing mode for the UE; and
   based at least in part on determining that the TCC is not in the emergency communications testing mode for the UE:
      determining a second location for the UE based at least in part on the second emergency text message;
      determining a second PSAP based at least in part on the second location; and
      transmitting, from the TCC to the second PSAP, the second emergency text message.

3. The method of claim 1, wherein terminating the emergency communications testing mode for the UE at the TCC is based at least in part on transmitting the second text message.

4. The method of claim 1, wherein terminating the emergency communications testing mode for the UE at the TCC is based at least in part on determining that a threshold amount of time has passed since initiating the emergency communications testing mode.

5. The method of claim 1, wherein terminating the emergency communications testing mode for the UE at the TCC is based at least in part on receiving a second short code associated with terminating the emergency communications testing mode.

6. The method of claim 1, wherein determining the location for the UE comprises determining a latitude and a longitude for the UE represented in the emergency text message.

7. A gateway mobile location center (GMLC) comprising:
   one or more processors;
   one or more transceivers; and
   non-transitory computer-readable media storing computer-executable instructions that, when executed by the one or more processors, cause the one or more processors to perform operations comprising:
      receiving, at the GMLC from a text control center (TCC), an instruction to initiate an emergency communications testing mode for a user equipment (UE) at the GMLC;
      initiating the emergency communications testing mode for the UE at the GMLC;
      receiving, at the GMLC from a call routing node, a request for routing instructions for an emergency call requested by the UE;
      determining, at the GMLC, that the GMLC is in the emergency communications testing mode for the UE;
      based at least in part on determining that the GMLC is in the emergency communications testing mode for the UE:
         determining a location for the UE based at least in part on the request for the routing instructions;
         determining a public safety access point (PSAP) based at least in part on the location; and
         transmitting, from the GMLC to the UE, a message comprising an indication of the PSAP; and
      terminating the emergency communications testing mode for the UE at the GMLC.

8. The GMLC of claim 7, wherein the instruction to initiate the emergency communications testing mode comprises a short code associated with the emergency communications testing mode.

9. The GMLC of claim 7, wherein the message comprising the indication of the PSAP comprises a voice message comprising the indication of the PSAP.

10. The GMLC of claim 7, wherein initiating the emergency communications testing mode comprises starting a timer at the GMLC.

11. The GMLC of claim 10, wherein terminating the emergency communications testing mode for the UE comprises:
   determining, based at least in part on the timer, that a threshold amount of time has passed since initiating the emergency communications testing mode; and terminating the emergency communications testing mode for the UE based at least in part on determining that the threshold amount of time has passed.

12. The GMLC of claim 7, wherein the operations further comprise:
receiving, at the GMLC from a second call routing node, a second request for second routing instructions for a second emergency call requested by the UE;
determining that the GMLC is not in the emergency communications testing mode for the UE; and
based at least in part on determining that the GMLC is not in the emergency communications testing mode for the UE:
determining a second location for the UE based at least in part on the second request for routing instructions;
determining a second PSAP based at least in part on the second location; and
transmitting, from the GMLC to the second call routing node, the second routing instructions comprising an indication of the second PSAP.

13. The GMLC of claim 7, wherein terminating the emergency communications testing mode for the UE is based at least in part on transmitting the message comprising the indication of the PSAP.

14. The GMLC of claim 7, wherein:
the operations further comprise receiving a second instruction to terminate the emergency communications testing mode for the UE at the GMLC; and
terminating the emergency communications testing mode for the UE is based at least in part on the second instruction.

15. A non-transitory computer-readable media storing computer-executable instructions that, when executed by one or more processors, cause the one or more processors to perform operations comprising:
receiving, at a wireless communications network component from a user equipment (UE), a text message comprising a short code associated with an emergency communications testing mode;
initiating, at the wireless communications network component based at least in part on the short code, the emergency communications testing mode for the UE;
receiving emergency communications from the UE;
determining that the UE is associated with the emergency communications testing mode;
based at least in part on determining that the UE is associated with the emergency communications testing mode:
determining a location for the UE based at least in part on the emergency communications;
determining a public safety access point (PSAP) based at least in part on the location; and
transmitting an indication of the PSAP to the UE; and
terminating the emergency communications testing mode for the UE.

16. The non-transitory computer-readable media of claim 15, wherein initiating the emergency communications testing mode for the UE comprises transmitting an instruction to a gateway mobile location center (GMLC) to initiate the emergency communications testing mode for the UE at the GMLC.

17. The non-transitory computer-readable media of claim 15, wherein terminating the emergency communications testing mode for the UE comprises:
receiving a second text message comprising the short code; and
terminating the emergency communications testing mode for the UE based at least in part on receiving the second text message.

18. The non-transitory computer-readable media of claim 15, wherein determining the location for the UE comprises determining a latitude and longitude for the UE from the emergency communications.

19. The non-transitory computer-readable media of claim 15, wherein initiating the emergency communications testing mode for the UE comprises:
determining an identifier for the UE from the text message; and
associating the identifier for the UE with the emergency communications testing mode.

20. The non-transitory computer-readable media of claim 15, wherein terminating the emergency communications testing mode for the UE is based at least in part on determining that a threshold amount of time has passed since initiating the emergency communications testing mode.

* * * * *